June 26, 1956  F. J. VON DELDEN  2,752,517
MOTOR CONSTRUCTION
Filed April 27, 1953  2 Sheets-Sheet 1

FLORENS J. VON DELDEN
INVENTOR.

BY
ATTORNEYS

June 26, 1956  F. J. VON DELDEN  2,752,517
MOTOR CONSTRUCTION

Filed April 27, 1953  2 Sheets-Sheet 2

FLORENS J. VON DELDEN
INVENTOR.

BY Lyon & Lyon
ATTORNEYS

United States Patent Office 2,752,517
Patented June 26, 1956

2,752,517
MOTOR CONSTRUCTION

Florens J. von Delden, Pasadena, Calif., assignor to General Controls Co., Glendale, Calif., a corporation of California Application April 27, 1953, Serial No. 351,095

7 Claims. (Cl. 310—89)

The present invention relates to improvements in the design of small self starting synchronous motors used in a variety of controlling and other devices.

As is well known, such motor includes a rotor structure which cooperates magnetically with a field structure and the rotor is coupled to a gear train. The field structure consists of a laminated stator, the two poles of which embrace the rotor. In order to make the motor self-starting, the poles are slotted and equipped with shading coils. This feature provides the required flux line shift to obtain the necessary starting torque. Usually, the rotor comprises a plurality of hardened magnetic steel discs and such discs are enclosed within a metal housing which serves also as a closure member for a gear box which houses the abovementioned gear train. According to one feature of the present invention, the stator is constructed from a series of pre-punched laminations in such a manner that the flux is more concentrated in that region between the poles and the rotor. Moreover, this improved stator construction reduces leakage, heat and stray flux to a minimum. Also, since the flux for each rotor disc is concentrated there is less tendency for the rotor shaft to hunt in its axial direction. Further, the abovementioned closure member is made of non-magnetic plastic material so as not to disturb the concentrated field which is desired here and to reduce losses to a minimum. By these means, the power consumption of the motor is reduced considerably. Another important result is that the construction of the gear train may be simplified inasmuch as no compensation is required, in this instance, for axial movement of the rotor shaft. A further result is that the motor is rendered less noisy which, of course, is a highly desirable feature when it is desired to use motors of this character in bedrooms to control, for example, a heating cycle.

It is, therefore, a general object of the present invention to provide means and techniques whereby the aforementioned results may be obtained.

A specific object of the present invention is to provide an improved stator for motors of this character.

Another specific object of the present invention is to provide a motor construction of this character in which end play of the rotor shaft is reduced to a minimum.

Another specific object of the present invention is to provide an improved stator structure which cooperates with a plurality of disc members comprising the rotor such that the leakage or stray flux is reduced to a minimum to thereby render the operation of the motor more efficient.

Still another object of the present invention is to provide an improved motor construction of this character in which the housing for the rotor is of non-metallic material thereby avoiding the effects of eddy currents and producing no disturbance in the concentrated magnetic field desired between the stator and the rotor.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
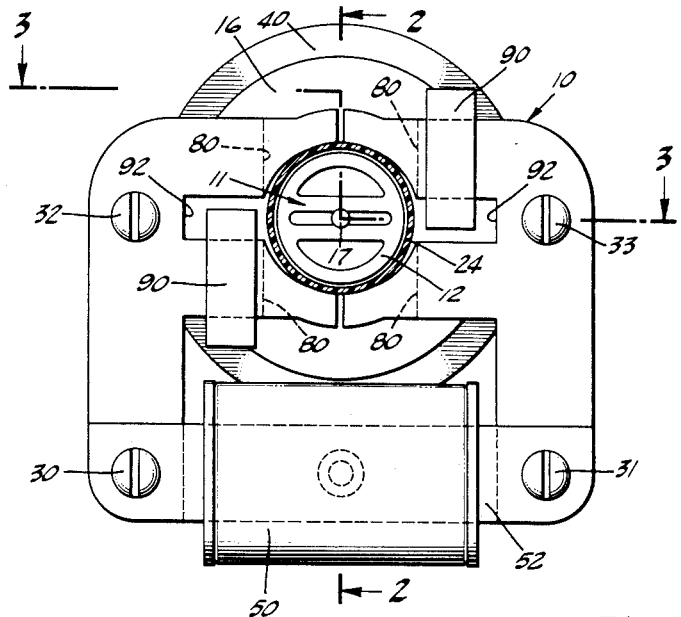
Figure 1 is a side elevation view of a clock motor embodying features of the present invention.

The motor shown in the drawings includes a stator having the general reference numeral 10, a rotor 11 which includes a pair of discs 12 and 14 and a gear train 15, which may be of conventional construction mounted in the gear box 16. The input shaft of the gear box 16 comprises the rotor shaft 17 and the output shaft of the gear box 16 mounts the gear 20.

A closure member 24, which is cup shaped encloses the shaft 17 and discs 12 and 14 and is affixed to the annular flange 16A of the rear box 16. This cup shaped closure member 24 is press fitted in the annular flange 16A and a sealing compound such as Glyptal is used to assure an oil and dust proof seal between these two members. The inner annular wall of the closure member 24 is preferably tapered so that any oil which may leak out of the gear box 16 may flow back into the gear box.

Thus, for all intents and purposes, the gear box 16 and closure member 24 may be considered to be a single unit. This closure member 24 in accordance with one of the features of the present invention is made from non-metallic, non-magnetic, transparent plastic such as Lucite.

The stator 10 embodies other important features of the present invention and in general, includes a stack of laminations which are bolted together by the four bolts 30, 31, 32 and 33. The bolts 32 and 33 extend through the laminations and are threaded in the threaded sleeves 34 and 35, respectively, which sleeves serve also as a mounting for the gear box 16, a ring 40 having ears 40A and 40B thereon contacts the gear box 16 and is affixed to the threaded sleeves 34 and 35 by the threaded bolts 42 and 43. When the bolts 42 and 43 are tightened as shown in the drawing, the flange 16A of the gear box 16 as well as the annular shoulder 24A (Figure 2) of the closure member 24 engage the stator laminations. By these means the gear box 16, is clamped between, on one hand the stator 10 and the ring 40 to provide a unit in which the rotor shaft 17 is free to rotate within the stator 10, with, of course, the gear box 16 maintained stationarily with respect to the stator 10.

The stator 10 is a two-pole stator and is supplied with flux from the coil 50 which circumscribes the so-called bridging laminations 52.

The stator 10 comprises essentially three types of laminations, namely so-called pole piece laminations 55 (Figure 4), spacing laminations 56 and so-called bridging laminations 52, all interlaced or interlocked.

Figure 4:
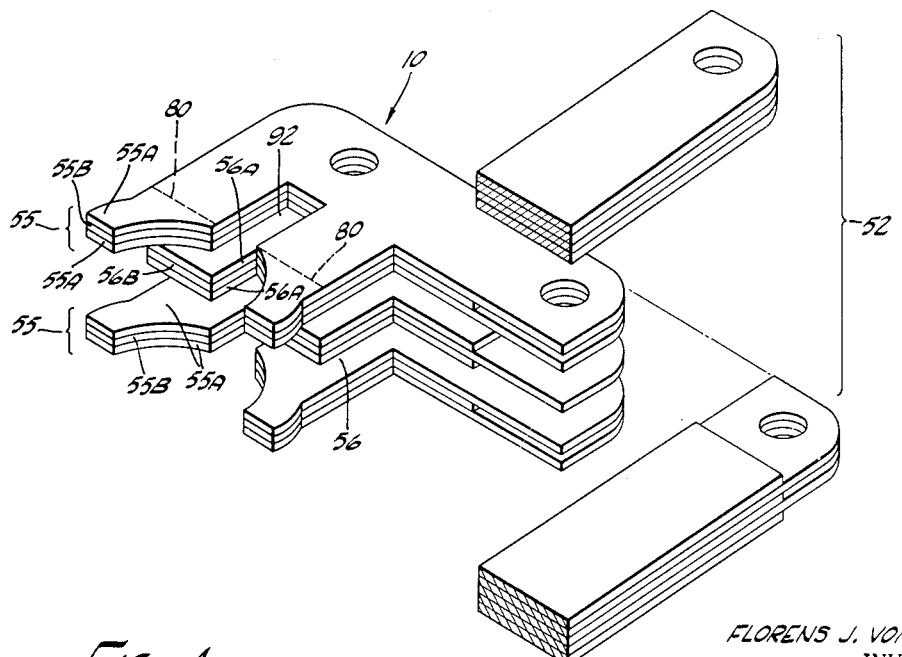
Figure 4 is a perspective view illustrating the manner in which laminations are assembled to produce the stator structure used in the clock motor shown in Figure 1.

While Figure 4 shows the laminations which comprise only one pole of the two-pole motor, it is understood that the other pole is formed in identical manner using laminations of the character now described in connection with Figure 4.

Figure 2:
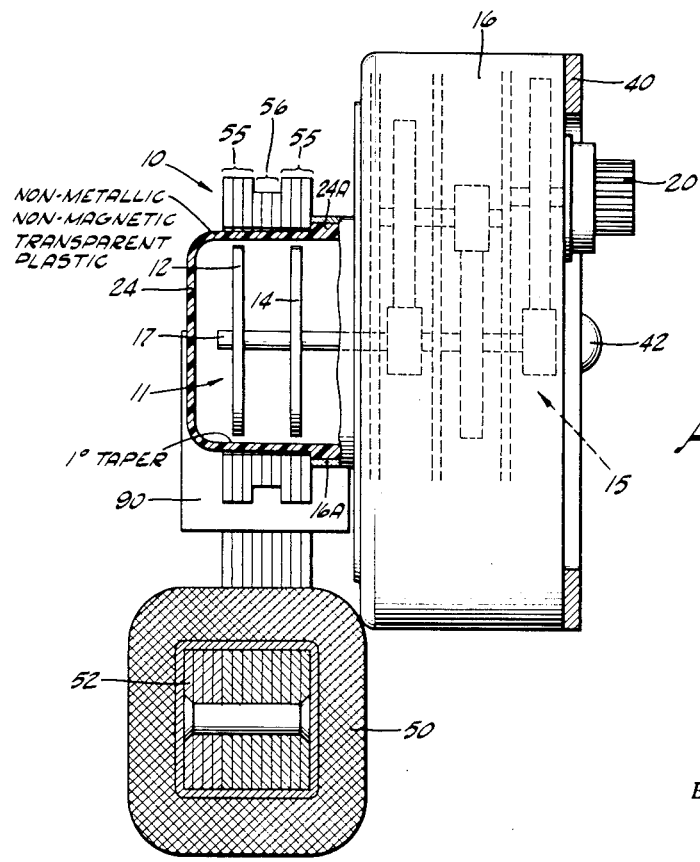
Figure 2 is a sectional view taken substantially on the line 2—2 of Figure 1.

Thus, for each pole there are two lamination sections or pole piece laminations 55, one corresponding to each of the two rotor discs 12 and 14 which are each centrally spaced, as shown in Figure 2, within the corresponding sections 55. In turn, each of such sections 55 includes three generally L-shaped laminations, there being two so-called long laminations 55A and one so-called short lamination 55B which is sandwiched between the two outer laminations 55A. Likewise, the so-called spacing laminations 56 are actually three in number and are generally L shaped, there being two so-called short laminations 56A and one so-called long lamination 56B which is sandwiched between the two outer laminations 56A. These so-called long and short laminations are provided whereby, in general, the lamination sections 56 and 55 may be interlocked or interlaced with the laminations comprising the bridge lamination section 52. It is observed that the spacing lamination section 56 is sandwiched between the two outer pole piece or lamination sections 55. It is also observed that the so-called pole piece lamination sections 55 each has a semi-circularly apertured open ended portion adapted to partially embrace a corresponding rotor disc 12, 14.

Figure 3:
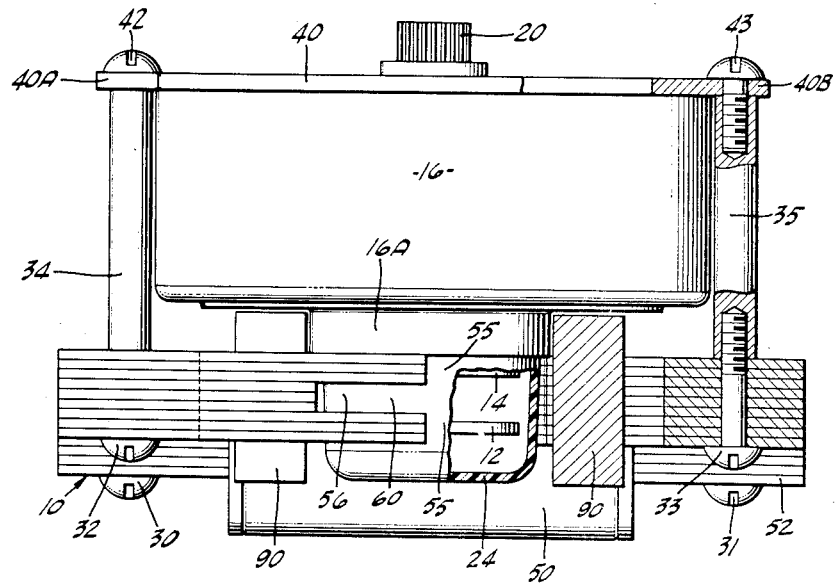
Figure 3 is a sectional view taken substantially on the line 3—3 of Figure 1.

In accordance with another feature of the present invention, the so-called spacing lamination section 56 terminates near the aforementioned open ended apertured portions of the sections 55 with the result that, there is an air gap 60 (Figure 3) between the sections 55. This air gap 60 is purposely provided to minimize leakage and stray fluxes and to concentrate the flux, in a region, which is defined on the one hand between first section 55 and a rotor disc 12 and on the other hand between a second stator section 55 and the other rotor disc 14. Tests have shown that this construction produces a more efficient motor, one which requires a relatively small power input in the order of only one watt.

Each of the two lamination sections 55 as described above, has semi-circularly apertured open ended portions and for purposes of reference such portion is considered to be that portion to the left of the dotted line 80 in Figure 4. In this respect, it is observed that the spacing laminations 56A terminate near such line 80.

In order that the motor be self-starting a shading coil 90 (Figure 1) is associated with each pole. Each of these shading coils 90 comprises simply a heavy copper bar having a rectangular window therein through which each of the three lamination sections 55, 56 and 55 passes. These shading coils 90 are maintained in position shown in Figure 1 by a combination of friction forces and some fluing compound such as Glyptal. In other words, each of the two poles of the motor is split and a shading coil is mounted on a split portion of each pole. As shown in Figure 1, those portions on opposite poles which mount a shading coil are diametrically opposed. These shading coils 90 are for starting purposes and the operating speed of the motor is not changed, the operating speed being the synchronous speed for a two-pole machine, namely 3600 R. P. M. for a 60 cycle energizing cart applied to the energizing coil 51.

In order to accommodate the shading coils 90 each of the three lamination sections 55, 56 and 55 are slotted as illustrated at 92 in Figure 4.

Each of the rotor discs 12, 14 is preferably of tungsten steel and, of course, is paramagnetic and need not necessarily be a permanent magnet. Each of such discs 12, 14 has a thickness in the order of $8/1000$ of an inch or more.

The motor thus described, finds particular usefulness in control systems using temperature responsive elements such as bimetallic strips. In such case, because of the increased efficiency of the motor, less power is dissipated as heat which otherwise would influence the associated bimetallic strip in a detrimental manner. As a matter of fact, it is now common practice to set the response point of thermostats off a few degrees in order to compensate for the heating which results from power losses in the associated clock motor. Using, the present motor construction, it is established that a minimum or no compensation will be necessary.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a motor construction of the character described, a gear box having an input shaft and an output shaft, a first and a second rotor unmodified disc mounted in spaced relationship on said input shaft with the planes of said discs extending perpendicular to the axis of rotation of said shaft, said discs being spaced apart a predetermined distance, a stack of laminations comprising a first laminated section, a second laminated section and a third laminated section sandwiched between said first and second sections, said first section and second sections each having a single semi-circularly apertured open ended portion with a curvature substantially the same as the curvature of the discs and adapted to partially embrace said first and second rotor disc elements respectively, said third section of laminations maintaining said first and second sections in spaced relationship, said third section terminating near said open ended apertured portion whereby an air gap exists between the spaced open ended portions of said first and second sections.

2. In a motor construction of the character described, a rotor shaft having a pair of spaced unmodified discs thereon, a stator having three sections, one of said stator sections being sandwiched between the other two sections, said other two sections, each having a single apertured open ended portion having a curvature substantially the same as the curvature of the discs and adapted to partially embrace a corresponding one of said rotor elements, and said one stator section terminating near said open ended apertured portion whereby an air space exists between the spaced open ended portions of said other sections.

3. In a motor construction of the character described, a gear box having an input shaft extending outwardly therefrom, a rotor element mounted on said shaft, a non-metallic closure member enclosing said shaft and said rotor element and being affixed to said gear box, said closure member having an annular shoulder, a stator structure encircling said closure member and cooperating magnetically with said rotor element, means fastening said stator structure to said gear box, said means comprising a clamping element with the gear box disposed between said stator structure and said clamping element, said stator structure being provided with an annular opening engageable with said annular shoulder on said closure member, and screw threaded means for mounting said clamping element on said stator structure.

4. In a motor construction of the character described, a rotor shaft, a pair of spaced modified discs mounted on said shaft, a stator structure cooperating magnetically with said rotor element, said stator structure comprising a pair of spaced pole piece sections having outer ends conforming generally with the periphery of a corresponding disc but spaced therefrom, and means spacing said pole piece sections along the axis of rotation of said shaft to define an air gap therebetween.

5. A construction as set forth in claim 4 including, said shaft being a shaft extending from a gear box, a non-metallic closure member mounted on said gear box and enclosing said shaft and said discs, said stator structure encircling said closure member and cooperating magnetically with said discs.

6. In a motor construction of the character described, a rotor shaft, a pair of rotor elements mounted in spaced relationship on said shaft along the axis of rotation of the same, a stator structure cooperating magnetically with said rotor elements, said stator structure comprising a pair of poles, each of said two poles having a pair of legs, one leg of each of said poles having a shading coil mounted thereon, each of said legs having a pair of pole piece lamination sections between which is sandwiched a spacing lamination section, each of said pole piece sections having outer ends conforming generally with the periphery of a corresponding one of said rotor elements, each of said rotor elements being centrally disposed within a corresponding pole piece section, and said spacing section terminating near said outer end to allow an air gap to exist between the two pole piece sections.

7. In a motor construction of the character described, a gear box having an input shaft extending outwardly therefrom, a pair of rotor elements mounted in spaced relationship on said shaft, a non-metallic closure member mounted on said gear box and enclosing said shaft and said rotor elements, a stator structure encircling said closure member and cooperating magnetically with said rotor elements, said stator structure having a pair of poles, each of said poles comprising a pair of spaced pole piece sections and a spacing section sandwiched between said pole piece sections, each of said pole piece sections having an arcuate end conforming generally with the periphery of a corresponding rotor element, said spacing section terminating near said arcuate end to thereby allow an air gap to exist between said spaced pole piece section ends, each of said poles being slotted to provide a pair of legs on each pole, a shading coil mounted on one leg of each pole, said shading coil encircling the pole piece sections as well as the spacing section.

References Cited in the file of this patent

UNITED STATES PATENTS

| | | |
|---|---|---|
| 1,495,936 | Warren | May 27, 1924 |
| 1,546,269 | Warren | July 14, 1925 |
| 1,895,356 | Warren | Jan. 24, 1933 |
| 1,955,588 | Knopp | Apr. 17, 1934 |
| 2,003,163 | Warren | May 28, 1935 |